(12) United States Patent
Etienne

(10) Patent No.: US 11,032,983 B2
(45) Date of Patent: Jun. 15, 2021

(54) IRRIGATION SYSTEM

(71) Applicant: NRG HOLDINGS, LLC, Jericho, NY (US)

(72) Inventor: Elius Etienne, Maplewood, NJ (US)

(73) Assignee: NRG HOLDINGS, LLC, Jericho, NY (US)

( * ) Notice: Subject to any disclaimer, the term of this patent is extended or adjusted under 35 U.S.C. 154(b) by 154 days.

(21) Appl. No.: 16/381,262

(22) Filed: Apr. 11, 2019

(65) Prior Publication Data
US 2020/0323156 A1 Oct. 15, 2020

(51) Int. Cl.
*A01G 25/16* (2006.01)
*H04N 5/33* (2006.01)

(52) U.S. Cl.
CPC ......... *A01G 25/167* (2013.01); *A01G 25/165* (2013.01); *H04N 5/33* (2013.01)

(58) Field of Classification Search
None
See application file for complete search history.

(56) References Cited

U.S. PATENT DOCUMENTS

| | | | |
|---|---|---|---|
| 5,870,302 A * | 2/1999 | Oliver | A01G 25/167 700/11 |
| 6,947,811 B2 * | 9/2005 | Addink | A01G 25/167 236/46 R |
| 2010/0263436 A1 * | 10/2010 | Caron | A01G 25/167 73/38 |
| 2012/0101796 A1 | 4/2012 | Lindores | |
| 2013/0332205 A1 | 12/2013 | Friedberg et al. | |
| 2014/0067745 A1 | 3/2014 | Avey et al. | |
| 2014/0343855 A1 | 11/2014 | AghaKouchak et al. | |
| 2017/0270624 A1 | 9/2017 | Rooney | |
| 2017/0325418 A1 * | 11/2017 | Madgavkar | G05D 7/0676 |
| 2018/0314949 A1 | 11/2018 | Bender et al. | |

OTHER PUBLICATIONS

Elius Etienne, et al., Development of a Demand Sensitive Drought Index and its application for agriculture over the conterminous United States. Journal of Hydrology 534(2016) www.elsevier.com/locate/hyrdol, pp. 219-229.

* cited by examiner

*Primary Examiner* — Paul B Yanchus, III
(74) *Attorney, Agent, or Firm* — Carter, DeLuca & Farrell LLP; George Likourezos

(57) ABSTRACT

Technologies are described for devices and methods to irrigate a crop. The systems may comprise an irrigation processor configured to be in communication with, a memory, a soil moisture tension sensor, an infrared camera, and a valve. The irrigation processor may receive an input, soil moisture tension data, infrared data, ambient temperature data, humidity data, and weather data, and store each in the memory. The input may include a crop, an area planted, and a location. The irrigation processor may generate an output of a crop water stress index. The irrigation processor may generate a water requirement. The irrigation processor may determine an irrigation requirement. The irrigation processor may generate a determination to irrigate based on the soil moisture tension data, the output of the crop water stress index, and the irrigation requirement. The irrigation processor may operate the valve to irrigate based on the determination to irrigate.

20 Claims, 3 Drawing Sheets

IRRIGATION SYSTEM

BACKGROUND

Unless otherwise indicated herein, the materials described in this section are not prior art to the claims in this application and are not admitted to be prior art by inclusion in this section.

Irrigation may be an application of controlled amounts of water to an area of land for plants or crops at determined intervals. Irrigation may be beneficial during periods of less than average rainfall. Irrigation may be beneficial to support agriculture and crops in areas where natural rainfall is insufficient.

SUMMARY

One embodiment of the invention is a system to irrigate a crop. The system may comprise an irrigation processor. The system may comprise a memory. The memory may include irrigation instructions. The irrigation processor may be configured to be in communication with the memory. The system may comprise a soil moisture tension sensor. The soil moisture tension sensor may be configured to be in communication with the irrigation processor. The system may comprise an infrared camera. The infrared camera may be configured to be in communication with the irrigation processor. The system may comprise a valve. The valve may be configured to be in communication with the irrigation processor. The irrigation processor may be configured to execute the irrigation instructions to receive an input. The input may include a crop, an area planted, and a location. The irrigation processor may be configured to store the input in the memory. The irrigation processor may be configured to receive soil moisture tension data from the soil moisture tension sensor and store the soil moisture tension data in the memory. The irrigation processor may be configured to receive infrared data from the infrared camera and store the infrared data in the memory. The irrigation processor may be configured to receive ambient temperature data and store the ambient temperature data in the memory. The irrigation processor may be configured to receive humidity data and store the humidity data in the memory. The irrigation processor may be configured to generate an output of a crop water stress index for the crop based on the crop, the infrared data, the ambient temperature data, and the humidity data and store the output of the crop water stress index in the memory. The irrigation processor may be configured to receive weather data and store the weather data in the memory. The irrigation processor may be configured to generate a water requirement for the crop based on the crop, the area planted, and an evapotranspiration of the crop and store the water requirement in the memory. The irrigation processor may be configured to determine an irrigation requirement for the crop based on the water requirement for the crop and the weather data and store the irrigation requirement in the memory. The irrigation processor may be configured to generate a determination to irrigate the crop based on the soil moisture tension data, the output of the crop water stress index, and the irrigation requirement. The irrigation processor may be configured to operate the valve to an open position to irrigate the crop based on the determination to irrigate the crop.

Another embodiment of the invention includes a device effective to irrigate a crop. The device may comprise an irrigation processor. The device may comprise a memory. The memory may include irrigation instructions. The irrigation processor may be configured to be in communication with the memory. The irrigation processor may be configured to execute the irrigation instructions to receive an input. The input may include a crop, an area planted, and a location. The irrigation processor may be configured to store the input in the memory. The irrigation processor may be configured to receive soil moisture tension data and store the soil moisture tension data in the memory. The irrigation processor may be configured to receive infrared data and store the infrared data in the memory. The irrigation processor may be configured to receive ambient temperature data and store the ambient temperature data in the memory. The irrigation processor may be configured to receive humidity data and store the humidity data in the memory. The irrigation processor may be configured to generate an output of a crop water stress index for the crop based on the crop, the infrared data, the ambient temperature data, and the humidity data. The irrigation processor may be configured to store the output of the crop water stress index in the memory. The irrigation processor may be configured to receive weather data and store in the memory. The irrigation processor may be configured to generate a water requirement for the crop based on the crop, the area planted, and an evapotranspiration of the crop. The irrigation processor may be configured to store the water requirement in the memory. The irrigation processor may be configured to determine an irrigation requirement for the crop based on the water requirement for the crop and the weather data. The irrigation processor may be configured to store the irrigation requirement in the memory. The irrigation processor may be configured to receive reservoir level data and store the reservoir level data in the memory. The irrigation processor may be configured to generate a determination to irrigate the crop based on the soil moisture tension data, the output of the crop water stress index, the irrigation requirement, and the reservoir level data. The irrigation processor may be configured to operate a valve to irrigate the crop based on the determination to irrigate the crop.

Another embodiment of the invention is a method to irrigate a crop. The method may comprise an irrigation processor receiving an input. The input may include a crop, an area planted, and a location. The method may comprise the irrigation processor storing the input in the memory. The method may comprise the irrigation processor receiving soil moisture tension data and storing the soil moisture tension data in the memory. The method may comprise the irrigation processor receiving infrared data and storing the infrared data in the memory. The method may comprise the irrigation processor receiving ambient temperature data and storing the ambient temperature data in the memory. The method may comprise the irrigation processor receiving humidity data and storing the humidity data in the memory. The method may comprise the irrigation processor generating an output of a crop water stress index for the crop based on the crop, the infrared data, the ambient temperature data, and the humidity data. The method may comprise the irrigation processor storing the output of the crop water stress index in the memory. The method may comprise the irrigation processor receiving weather data and storing the weather data in the memory. The method may comprise the irrigation processor generating a water requirement for the crop based on the crop, the area planted, and an evapotranspiration of the crop. The method may comprise the irrigation processor storing the water requirement in the memory. The method may comprise the irrigation processor determining an irrigation requirement for the crop based on the water requirement for the crop and the weather data. The method may comprise the irrigation processor storing the irrigation requirement in the memory. The method may comprise the irrigation processor generating a determination to irrigate the crop based on the soil moisture tension data, the output of the crop water stress index, and the irrigation requirement. The method may comprise the irrigation processor operating a valve to irrigate the crop.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1:
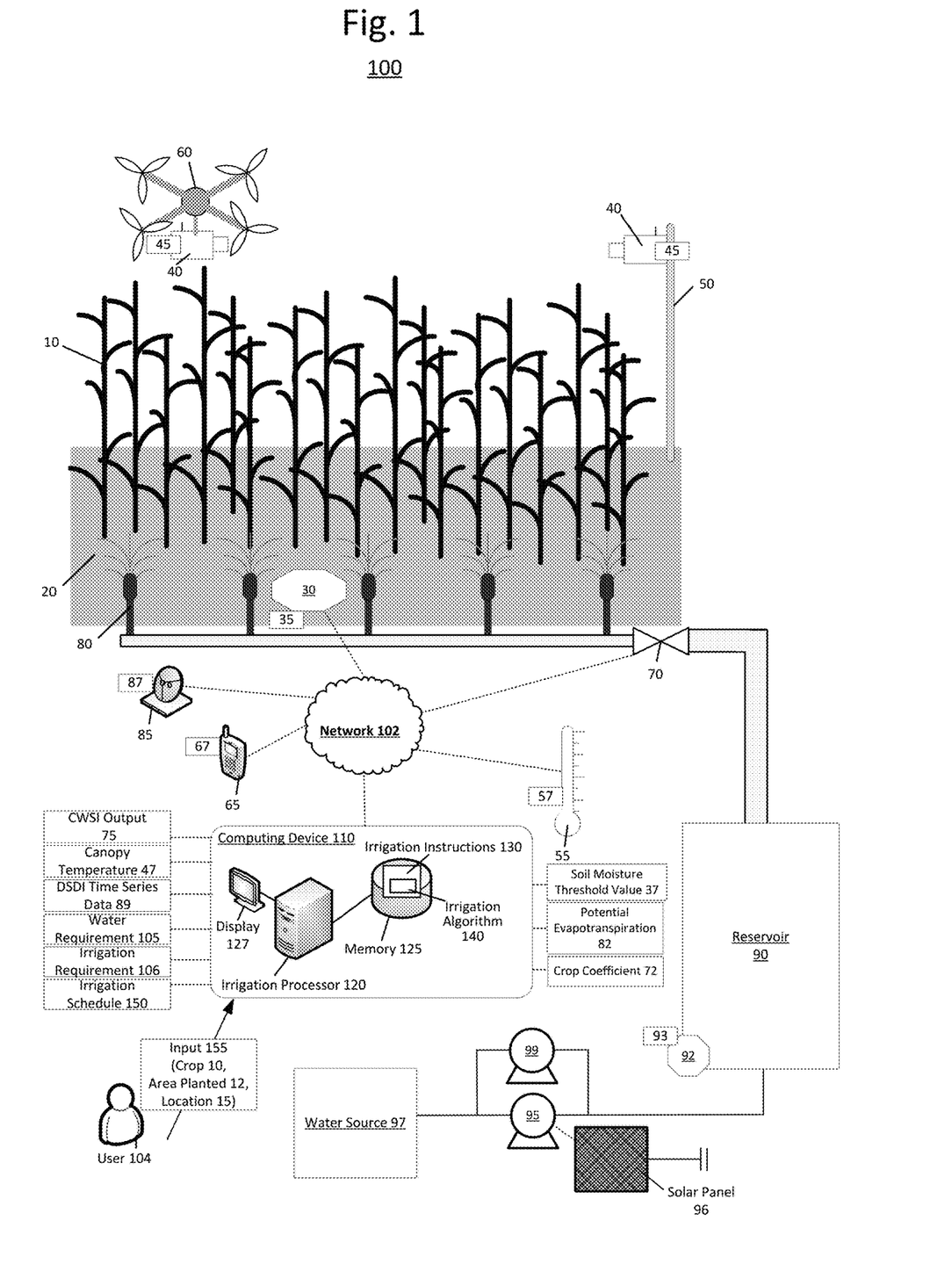
FIG. 1 illustrates an example system depicting an implementation of an irrigation system.

FIG. 1 illustrates an example system 100 depicting an implementation of an irrigation system, arranged in accordance with at least some embodiments described herein. Irrigation system 100 may include a soil moisture tension sensor 30, an infrared camera 40, a thermometer 55, a drone 60, a psychrometer 65, a valve 70, a water reservoir 90 and a computing device 110. Soil moisture tension sensor 30, infrared camera 40, thermometer 55, drone 60, psychrometer 65, and valve 70 may all be configured to be in communication with computing device 110 through a network 102. Valve 70 may be piped between sprinklers 80 proximate to crop 10, and a water reservoir 90, and may control a flow of water from water reservoir 90 to sprinklers 80. Network 102 may be the Internet, a cellular network, a personal area network, a local area network, a wide area network, etc. Computing device 110 may include an irrigation processor 120, a memory 125, and a display 127, configured to be in communication with each other. In some examples, computing device 110 may include a desktop computer, a laptop computer, etc. Memory 125 may include irrigation instructions 130. Irrigation instructions may include an irrigation algorithm 140.

A user 104 of irrigation system 100 may provide an input 155 to processor 120. Input 155 may include an identification of crop 10, an area planted 12 of crop 10, and a location 15 of area planted 12. Crop 10 may be any crop, including barley, corn, cotton, hay, rice, sorghum, soybean, wheat, etc. Irrigation processor 120 may receive input 155 and store crop 10, area planted 12, and location 15 in memory 125.

Soil moisture tension sensor 30 may be located in a root zone of soil 20, an area proximate to roots of a crop 10. Soil 20 may lose water due to absorption by crop 10, direct evaporation, deep percolation, or any combination thereof. Soil moisture tension sensor 30 may be one of multiple soil moisture tension sensors 30. Soil moisture tension sensors 30 may be located throughout an area of soil 20 with crop 10 which is to be irrigated by irrigation system 100. Soil moisture tension sensor 30 may detect a tension related to water uptake in soil 20 in the root zone. Soil moisture tension sensor 30 may send soil moisture tension data 35 to irrigation processor 120 over network 102.

Irrigation processor 120 may receive soil moisture tension data 35 and execute irrigation instructions 130 and store soil moisture tension data 35 in memory 125. Irrigation processor 120 may receive soil moisture tension data 35 continually, or on a periodic basis such as daily, twice a day, hourly or any other time period defined by irrigation instructions 130. Irrigation processor 120 may execute irrigation instructions 130 to analyze soil moisture tension data 130 against previously received and saved soil moisture tension data 130 to determine whether soil moisture tension in the root zone of soil 20 increased from a last irrigation. Irrigation processor 120 may execute irrigation instructions 130 to analyze soil moisture tension data 130 against previously received and saved soil moisture tension data 130 to determine whether soil moisture tension in the root zone of soil 20 increased by a soil moisture threshold value 37.

Infrared camera 40 may be attached to drone 60 or mounted on a pole 50 proximate to a canopy of crop 10. Multiple infrared cameras 40 may be utilized in conjunction with drones 60, mounted on poles 50, or combinations therein. Infrared camera 40 may be configured to capture infrared data 45 related to an infrared image of crop canopy of crop 10. Irrigation processor 120 may execute irrigation instructions 130 to control the operation of drone 60. Infrared camera 40 may be mounted to drone 60. Irrigation processor 120 may fly drone 60 over crop 10 such that drone 60 is proximate to a crop canopy of crop 10. Irrigation processor 120 may control infrared camera 40 to capture infrared data 45 of crop canopy of crop 10. Infrared camera 40 may be mounted on a pole 50. Irrigation processor 120 may execute irrigation instructions 130 to control infrared camera 40 mounted on pole 50 to capture infrared data 45 of crop canopy of crop 10. Infrared camera 40 may send infrared data 45 to irrigation processor 120 over network 102.

Irrigation processor 120 may receive infrared data 45 and execute irrigation instructions 130 and store infrared data 45 in memory 125. Irrigation processor 120 may receive infrared data 45 continually, or on a periodic basis such as daily, twice a day, hourly or any other time period defined by irrigation instructions 130. Irrigation processor 120 may execute irrigation instructions 130 to analyze captured infrared data 45 to estimate a crop canopy temperature 47.

Irrigation processor 120 may store estimated crop canopy temperature 47 in memory 125.

Thermometer 55 may measure ambient temperature and generate ambient temperature data 57. Ambient temperature data 57 may include a temperature of ambient air proximate to crop 10. Thermometer 55 may send ambient temperature data 57 to irrigation processor 120. Irrigation processor 120 may receive ambient temperature data 57. Irrigation processor 120 may receive ambient temperature data 57 continually, or on a periodic basis such as daily, twice a day, hourly or any other time period defined by irrigation instructions 130. Irrigation processor 120 may store ambient temperature data 57 in memory 125.

Psychrometer 65 may measure atmospheric humidity and generate humidity data 67. Psychrometer 65 may generate humidity data 67 based on a difference in thermometer readings from a wet-bulb thermometer and a dry-bulb thermometer. Humidity data 67 may include a humidity reading of ambient air proximate to crop 10. Psychrometer 65 may send humidity data 67 to irrigation processor 120. Irrigation processor 120 may receive humidity data 67. Irrigation processor 120 may receive humidity data 67 continually, or on a periodic basis such as daily, twice a day, hourly or any other time period defined by irrigation instructions 130. Irrigation processor 120 may store humidity data 67 in memory 125.

Irrigation processor 120 may execute irrigation instructions 130 to generate an output 75 of a crop water stress index (CWSI) based on estimated crop canopy temperature 47, ambient temperature data 57, and humidity data 67. Crop water stress index output 75 may be a measure of a relative transpiration rate for crop 10. CWSI output 75 may indicate that crop 10 is under water stress when CWSI output is greater than zero. Irrigation processor 120 may execute irrigation instructions 130 to determine when CWSI output 75 is above a CWSI output threshold. A CWSI output threshold for CWSI output 75 may be in a range from 0 to 1.

Irrigation processor 120 may be in communication with a weather station 85. Weather station 85 may collect measurements related to weather at location 15. Weather station 85 may collect weather measurements including temperature, precipitation, wind speed, solar radiation, and altitude. Weather station 85 may generate weather data 87 based on collected measurements. Weather station 85 may send weather data 87 to irrigation processor 120 over network 102.

Irrigation processor may receive weather data 87 and execute irrigation instructions 130 and store weather data 87 in memory 125. Irrigation processor 120 may receive weather data 87 continually, or on a periodic basis such as daily, twice a day, hourly or any other time period defined by irrigation instructions 130. Irrigation processor 120 may execute irrigation instructions 130 to analyze weather data 87. Irrigation processor 120 may generate a potential evapotranspiration 82 for location 15 based on weather data 87. A coefficient 72 for crop 10 may account for an effect of characteristics of crop 10 on a water requirement for crop 10. Coefficient 72 of crop 10 may be specific for location 15. Irrigation processor 120 may execute irrigation instructions 130 to generate a water requirement 105 for crop 10 in area planted 12 based on crop 10, area planted 12, potential evapotranspiration 82 of location 15, and coefficient 72 of crop 10. Potential evapotranspiration 82 may represent an effect of climate on a water requirement for location 15. Irrigation processor 120 may generate an irrigation requirement 106 based on precipitation data within weather data 87 and water requirement 105 of crop 10 in area planted 12. Irrigation requirement 106 may be an amount of water that is required for irrigation system 100 to supply to crop 10 to supplement water from precipitation and other natural water events. When irrigation requirement 106 is greater than zero, irrigation for crop 10 may be required. Irrigation processor 120 may store water requirement 105 and irrigation requirement 106 in memory 125.

Water reservoir 90 may have a water level sensor 92 which may be in communication with irrigation processor 120. Water level sensor 92 may detect a water level of water reservoir 90 and generate reservoir level data 93. Reservoir level data 93 may include data related to an availability of water from water reservoir 90. Water level sensor 92 may send reservoir level data 93 to irrigation processor 120. Irrigation processor 120 may receive reservoir level data 93 and execute irrigation instructions 130 and store reservoir level data 93 in memory 125. Irrigation processor 120 may receive reservoir level data 93 and execute irrigation instructions 130 to determine a level of water within water reservoir 90 and may determine water in water reservoir 90 is available for irrigation system 100. Irrigation processor 120 may receive reservoir level data 93 continually, or on a periodic basis such as daily, twice a day, hourly or any other time period defined by irrigation instructions 130.

Water reservoir 90 may be automatically filled to ensure water reservoir 90 is full and water is available to irrigation system 100 when reservoir level data 93 indicates a water level of water reservoir 90 is below a threshold level. A water source 97 may be connected to water reservoir 90 through pipes. Water source 97 may be groundwater such as a well, a surface water body such as a lake or river, or a municipal reservoir. A primary solar pump 95 and a backup powered pump 99 may be connected to the pipes to pump water from water source 97 to water reservoir 90. Primary solar pump 95, may be powered by a solar panel 96, and may pump water when weather data 87 includes that solar radiation is available and reservoir level data 93 indicates the water level of water reservoir 90 is below a reservoir threshold level. Backup powered pump 99 may pump water when solar energy is not available and reservoir level data 93 indicates the water level of water reservoir 90 is below the reservoir threshold level. Solar panel 96 may also be connected to an electrical grid system and may supply electric energy to the grid system when weather data 87 indicates that solar radiation is available and the water level of reservoir 90 is above a reservoir threshold level.

A size of water reservoir 90 may be determined based on a water demand on irrigation system 100. Irrigation processor 120 may execute irrigation instructions 130 to generate demand sensitive drought index (DSDI) time series data 89. Demand sensitive drought index time series data 89 may indicate a water deficit time series derived from an imbalance of time series of water supply and water demand for crop 10 in area planted 12 over a period of time. Water reservoir 90 may be sized base on a largest value of a water deficit between determined water demand and water supply based on demand sensitive drought index (DSDI) time series data 89. Water reservoir 90 may include multiple reservoirs of different sizes and may be expanded by adding additional units as water storage needs change and grow.

Irrigation processor 120 may execute irrigation instructions 130 and analyze soil moisture tension data 35, CWSI output 75, irrigation requirement 106, and reservoir level data 93. Irrigation processor 120 may generate an irrigation determination 150 to irrigate based on soil moisture tension data 35, CWSI output 75, irrigation requirement 106, and reservoir level data 93. For example, irrigation processor 120 may execute irrigation instructions 130 to determine that the soil moisture tension data 35 indicates that the soil moisture tension rate is increasing. Irrigation processor 120 may execute irrigation instructions 130 to determine that CWSI output 75 indicates that crop 10 is under water stress. Irrigation processor 120 executing irrigation instructions 130 may determine irrigation requirement 106 is greater than zero. Irrigation processor 120 executing irrigation instructions 130 may determine reservoir level data indicates a water level within water reservoir 90 is above a reservoir threshold level. Irrigation processor 120 may generate irrigation determination 150 to irrigate based on determining 1) the soil moisture tension data 35 indicates that the soil moisture tension rate is increasing and 2) the CWSI output 75 indicates that crop 10 is under water stress. Irrigation processor 120 may generate irrigation determination 150 to irrigate based on determining 1) the soil moisture tension data 35 indicates that the soil moisture tension rate is increasing, 2) the CWSI output 75 indicates that crop 10 is under water stress, and 3) the irrigation requirement 106 is greater than zero. Irrigation processor 120 may generate irrigation determination 150 to irrigate based on determining 1) the soil moisture tension data 35 indicates that the soil moisture tension rate is increasing, 2) the CWSI output 75 indicates that crop 10 is under water stress, 3) the irrigation requirement 106 is greater than zero and 4) the reservoir level data indicates a water level within water reservoir 90 is above a reservoir threshold level. Irrigation processor 120 may generate an irrigation determination 150 to not irrigate when one of the previous determinations is not met. For example irrigation processor 120 may generate an irrigation determination 150 to not irrigate when irrigation processor 120 determines that the soil moisture tension data 35 indicates that the soil moisture tension rate is not increasing. Irrigation processor 120 may generate an irrigation determination 150 to not irrigate when irrigation processor 120 determines that CWSI output 75 indicates that crop 10 is not under water stress. Irrigation processor 120 may generate an irrigation determination 150 to not irrigate when irrigation processor 120 determines the irrigation requirement 106 is less than zero. Irrigation processor 120 may generate an irrigation determination 150 to not irrigate when irrigation processor 120 determines the reservoir level data indicates a water level within water reservoir 90 is below a reservoir threshold level.

Irrigation processor 120 may operate valve 70 to an open position to control a flow of water from water reservoir 90 to sprinklers 80 and irrigate crop 10 based on an irrigation determination 150 to irrigate. Irrigation processor 120 may execute irrigation instructions 130 to open valve 70 for a predetermined period of time based on irrigation determination 150 to irrigate. Irrigation processor 120 may operate valve 70 to a closed position after the predetermine period of time. Irrigation processor 120 may continually monitor soil moisture tension data 35, CWSI output 75, irrigation requirement 106, and reservoir level data 93. Irrigation monitor may operate valve 70 to a closed position upon one of the following determinations: 1) the soil moisture tension data 35 indicates that the soil moisture tension rate is not increasing, 2) the CWSI output 75 indicates that crop 10 is not under water stress, 3) the irrigation requirement 106 is less than zero, or 4) the reservoir level data indicates a water level within water reservoir 90 is below a reservoir threshold level.

Figure 2:
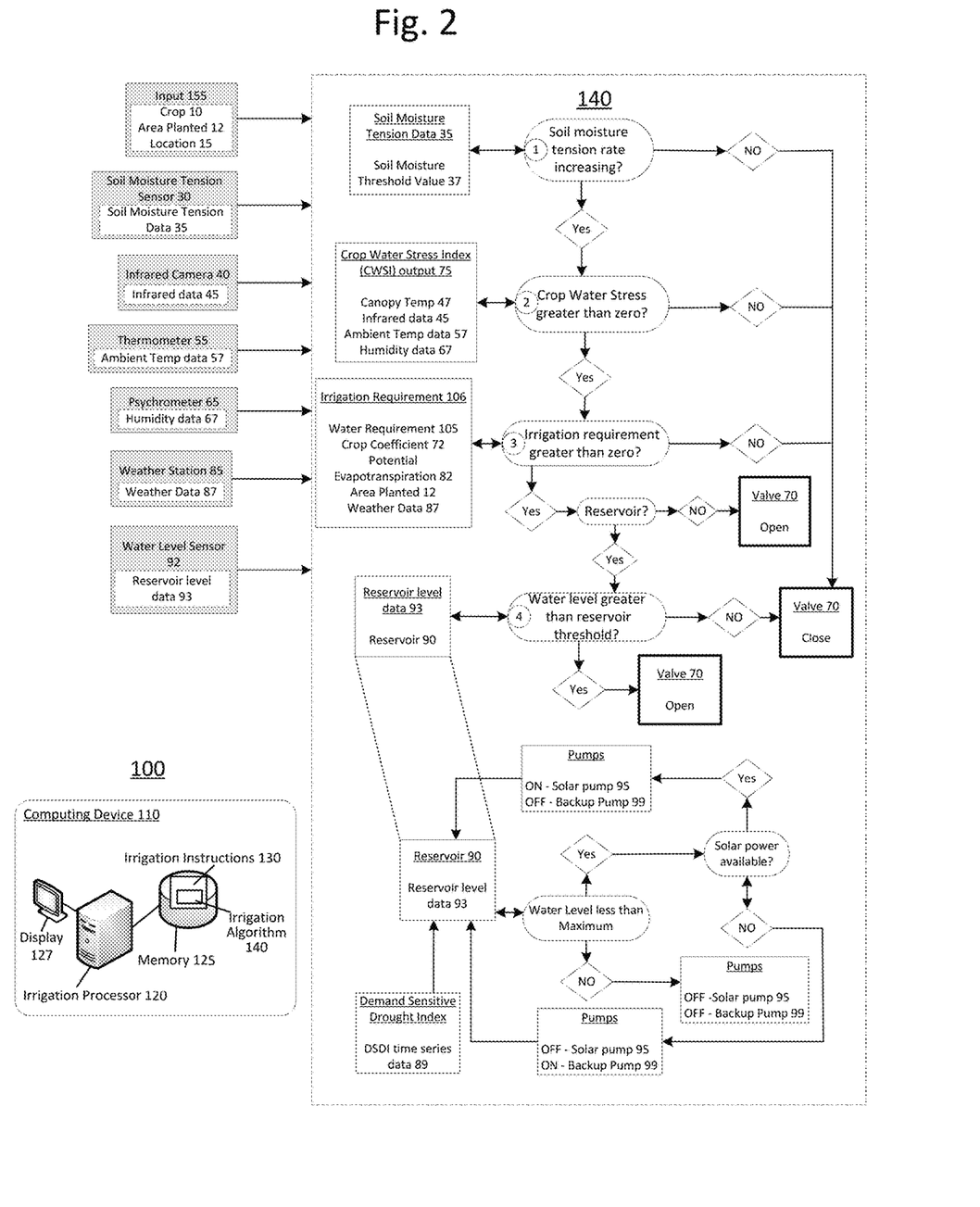
FIG. 2 illustrates an example system depicting an implementation of an irrigation system.

FIG. 2 illustrates an example system depicting an implementation of an irrigation system, arranged in accordance with at least some embodiments described herein. Those components in FIG. 2 that are labelled identically to components of FIG. 1 may not be described again for the purposes of clarity and brevity.

Irrigation instructions 130 may include irrigation algorithm 140 and may be executed by irrigation processor 120. Irrigation processor 120 may receive input 155. Input 155 may include crop 10, area planted 12, and location 15. Irrigation processor 120 may receive soil moisture tension data 35 from soil moisture tension sensor 30, infrared data 45 from infrared camera 40, ambient temperature data 57 from thermometer 55, humidity data 67 from psychrometer 65, weather data 87 from weather station 85, and reservoir level data 93 from water level sensor 92. Irrigation processor 120 may execute irrigation algorithm 140 based on crop 10, area planted 12, location 15, soil moisture tension data 35, weather data 87, infrared data 45, ambient temperature data 57, humidity data 67, and reservoir level data 93. Irrigation processor may execute irrigation algorithm 140 to determine canopy temperature 47, crop water stress index (CWSI) output 75, water requirement 105, and irrigation requirement 106.

At (1) irrigation processor 120 may execute irrigation algorithm 140 to determine if the soil moisture tension rate is increasing based on soil moisture tension data 35. At (2) irrigation processor may execute irrigation algorithm 140 to determine if a crop water stress as indicated by crop water stress index output 75 is greater than zero. At (3) irrigation processor may execute irrigation algorithm 140 to determine if irrigation requirement 106 is greater than zero. At (4) irrigation processor may execute irrigation algorithm 140 to determine if a water level of water reservoir 90 is greater than a reservoir level threshold. Irrigation processor 120 executing irrigation algorithm 140, upon a determination of "Yes" for determinations (1), (2), (3), and (4), may operate valve 70 to an open position to irrigate. Irrigation processor 120 executing irrigation algorithm 140, upon a determination of "No" for any one of determinations (1), (2), (3), and (4), may operate valve 70 to a closed position to stop irrigation.

In an example, system may not include reservoir 90 and water may be supplied to valve 70 directly from a municipal water source. In such a scenario, irrigation processor 120 executing irrigation algorithm 140, upon a determination of the system not including a reservoir and "Yes" for determinations (1), (2), and (3), may operate valve 70 to an open position to irrigate.

Irrigation processor 120 may also execute irrigation algorithm 140 to maintain a water level of reservoir 90 at a maximum level based on reservoir level data 93. When reservoir level data 93 indicates that a water level of reservoir 90 is less than a maximum level and weather data 87 includes data that solar radiation is available, irrigation processor 120 may control solar pump 95 to fill reservoir 90. When reservoir level data 93 indicates that a water level of reservoir 90 is less than a maximum level and weather data 87 includes data that solar radiation is not available, irrigation processor 120 may control backup pump 99 to fill reservoir 90. When reservoir level data 93 indicates that a water level of reservoir 90 is at a maximum level, irrigation processor 120 may control solar pump 95 and backup pump 99 to an off position.

A system in accordance with the present disclosure may provide a user with an irrigation system that generates an irrigation schedule based on a water requirement of the crop and not on a periodic time. A system in accordance with the present disclosure may detect when crops are under water stress sooner and remedy the situation faster than previous irrigation systems. A system in accordance with the present disclosure may prevent overwatering as the system provides irrigation based on a crop water stress and not on a scheduled time.

Figure 3:
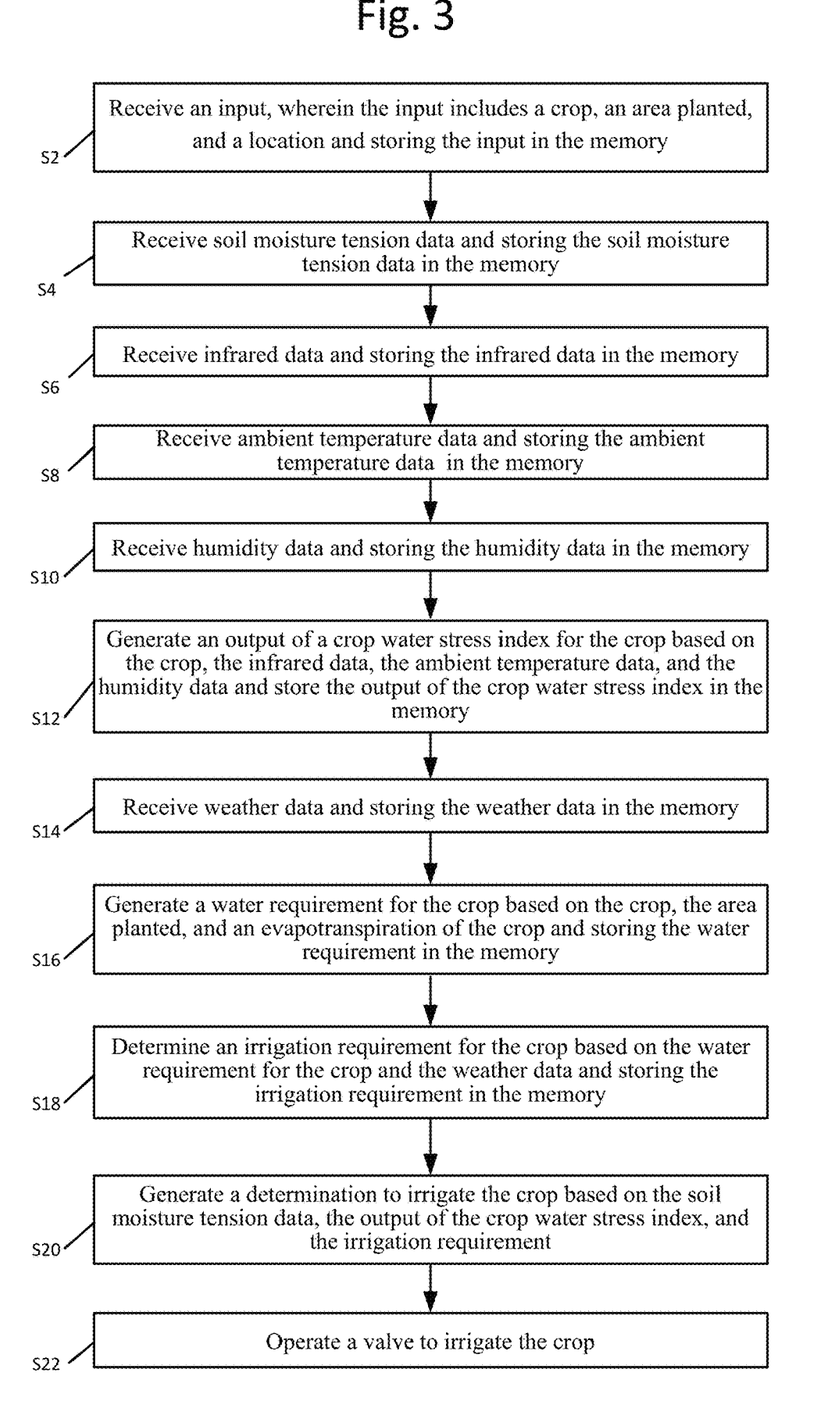
FIG. 3 illustrates a flow diagram for an example process to implement an irrigation system, all arranged according to at least some embodiments described herein.

FIG. 3 illustrates a flow diagram for an example process to implement a transducer data generator, arranged in accordance with at least some embodiments presented herein. The process in FIG. 3 could be implemented using, for example, system 100 discussed above. An example process may include one or more operations, actions, or functions as illustrated by one or more of blocks S2, S4, S6, S8, S10, S12, S14, S16, S18, S20 and/or S22. Although illustrated as discrete blocks, various blocks may be divided into additional blocks, combined into fewer blocks, or eliminated, depending on the desired implementation.

Processing may begin at block S2, "Receive an input, wherein the input includes a crop, an area planted, and a location and storing the input in the memory". At block S2, an irrigation processor may receive an input. The input may include a crop, an area planted, and a location. The crop may be any crop including barley, corn, cotton, hay, rice, sorghum, soybean, wheat, etc. The area planted may be an area planted of the crop. The location may be a location of the area that is planted with the crop. The irrigation processor may store the input in the memory.

Processing may continue from block S2 to block S4, "Receive soil moisture tension data and storing the soil moisture tension data in the memory". At block S4, the irrigation processor may receive soil moisture tension data from a soil moisture tension sensor. The soil moisture tension sensor may be located in a root zone of soil in an area proximate to roots of the crop. The irrigation processor may store the soil moisture tension data in a memory.

Processing may continue from block S4 to block S6, "Receive infrared data and storing the infrared data in the memory". At block S6, the irrigation processor may receive infrared data from an infrared camera. The infrared camera may be mounted to a drone or mounted to a pole and may capture infrared data of crop canopy of the crop. The irrigation processor may store the infrared data in the memory.

Processing may continue from block S6 to block S8, "Receive ambient temperature data and storing the ambient temperature data in the memory". At block S8, the irrigation processor may receive ambient temperature data from a thermometer. The ambient temperature data may include a temperature of ambient air proximate to the crop. The irrigation processor may store the ambient temperature data in the memory.

Processing may continue from block S8 to block S10, "Receive humidity data and storing the humidity data in the memory". At block S10, the irrigation processor may receive humidity data from a psychrometer. The humidity data may be based on a difference in thermometer readings from a wet-bulb thermometer and a dry-bulb thermometer. The humidity data may include a humidity reading of ambient air proximate to the crop. The irrigation processor may store the humidity data in the memory.

Processing may continue from block S10 to block S12, "Generate an output of a crop water stress index for the crop based on the crop, the infrared data, the ambient temperature data, and the humidity data and store the output of a crop water stress index in the memory". At block S12, the irrigation processor may execute irrigation instructions in the memory to generate an output of a crop water stress index for the crop. The output of the crop water stress index may be based on the crop, the infrared data, the ambient temperature data, and the humidity data. The output of the crop water stress index may be a measure of a relative transpiration rate for the crop. The output of the crop water stress index may indicate that the crop is under water stress when the output of the crop water stress index is greater than zero. The irrigation processor may store the output of the crop water stress index in the memory.

Processing may continue from block S12 to block S14, "Receive weather data and storing the weather data in the memory". At block S14, the irrigation processor may receive weather data from a weather station. The weather data may include weather measurements including temperature, precipitation, wind speed, solar radiation, and altitude. The irrigation processor may store the weather data in the memory.

Processing may continue from block S14 to block S16, "Generate a water requirement for the crop based on the crop, the area planted, and an evapotranspiration of the crop and storing the water requirement in the memory". At block S16, the irrigation processor may execute the irrigation instructions to generate a water requirement for the crop. The water requirement for the crop may be based on the crop, the area planted, and an evapotranspiration of the crop. The irrigation processor may store the water requirement for the crop in the memory.

Processing may continue from block S16 to block S18, "Determine an irrigation requirement for the crop based on the water requirement for the crop and the weather data and storing the irrigation requirement in the memory". At block S18, the irrigation processor may execute the irrigation instructions to generate an irrigation requirement for the crop. The irrigation requirement for the crop may be based on the water requirement for the crop and the weather data. The irrigation requirement may be an amount of water that is required for an irrigation system to supply to the crop to supplement water from precipitation and other natural water events. The irrigation processor may store the irrigation requirement for the crop in the memory.

Processing may continue from block S18 to block S20, "Generate a determination to irrigate the crop based on the soil moisture tension data, the output of the crop water stress index, and the irrigation requirement". At block S20, the irrigation processor may execute the irrigation instructions to generate a determination to irrigate the crop. The determination to irrigate the crop may be based on the soil moisture tension data, the output of the crop water stress index, and the irrigation requirement.

Processing may continue from block S20 to block S22, "Operate a valve to irrigate the crop". At block S22, the irrigation processor may execute the irrigation instructions to operate a valve to irrigate the crop. The valve may be piped between sprinklers proximate to the crop, and a water reservoir, and may control a flow of water from the water reservoir to the sprinklers.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system to irrigate a crop, the system comprising:
   an irrigation processor;
   a memory, wherein the memory includes irrigation instructions;

wherein the irrigation processor is configured to be in communication with the memory;
a soil moisture tension sensor configured to be communication with the irrigation processor;
an infrared camera configured to be communication with the irrigation processor; and
a valve configured to be communication with the irrigation processor;
wherein the irrigation processor is configured to execute the irrigation instructions to:
receive an input, wherein the input includes a crop, an area planted, and a location and store the input in the memory;
receive soil moisture tension data from the soil moisture tension sensor and store the soil moisture tension data in the memory;
receive infrared data from the infrared camera and store the infrared data in the memory;
receive ambient temperature data and store the ambient temperature data in the memory;
receive humidity data and store the humidity data in the memory;
generate an output of a crop water stress index for the crop based on the crop, the infrared data, the ambient temperature data, and the humidity data and store the output of a crop water stress index in the memory;
receive weather data and store the weather data in the memory;
generate a water requirement for the crop based on the crop, the area planted, and an evapotranspiration of the crop and store the water requirement in the memory;
determine an irrigation requirement for the crop based on the water requirement for the crop and the weather data and store the irrigation requirement in the memory;
generate a determination to irrigate the crop based on the soil moisture tension data, the output of the crop water stress index, and the irrigation requirement; and
operate the valve to an open position to irrigate the crop based on the determination to irrigate the crop.

2. The system of claim 1, further comprising the irrigation processor further configured to execute the irrigation instructions to:
receive reservoir level data and store the reservoir level data in the memory; and
generate the determination to irrigate the crop based on the soil moisture tension data, the output of the crop water stress index, the irrigation requirement, and the reservoir level data.

3. The system of claim 1, further comprising a drone, wherein the infrared camera is mounted on the drone and the irrigation processor is further configured to execute the irrigation instructions to control the operation of the drone to fly the drone proximate to a crop canopy of the crop.

4. The system of claim 1, wherein the infrared data is related to an infrared image of a crop canopy of the crop.

5. The system of claim 1, wherein the irrigation processor is further configured to execute the irrigation instructions to estimate a crop canopy temperature from the infrared data.

6. The system of claim 1, further comprising:
a water reservoir; and
sprinklers;
wherein the valve is piped between the water reservoir and the sprinklers.

7. The system of claim 5, wherein the water reservoir is sized based on demand sensitive drought index time series data.

8. The system of claim 1, wherein the irrigation processor receives at least one of the soil moisture tension data, the infrared data, the ambient temperature data, the humidity data, the weather data, and the reservoir level data continually.

9. A device effective to irrigate a crop, the device comprising:
an irrigation processor;
a memory, wherein the memory includes irrigation instructions;
wherein the irrigation processor is configured to be in communication with the memory and the irrigation processor is configured to execute the irrigation instructions to:
receive an input, wherein the input includes a crop, an area planted, and a location and store the input in the memory;
receive soil moisture tension data and store the soil moisture tension data in the memory;
receive infrared data and store the infrared data in the memory;
receive ambient temperature data and store the ambient temperature data in the memory;
receive humidity data and store the humidity data in the memory;
generate an output of a crop water stress index for the crop based on the crop, the infrared data, the ambient temperature data, and the humidity data and store the output of a crop water stress index in the memory;
receive weather data and store the weather data in the memory;
generate a water requirement for the crop based on the crop, the area planted, and an evapotranspiration of the crop and store the water requirement in the memory;
determine an irrigation requirement for the crop based on the water requirement for the crop and the weather data and store the irrigation requirement in the memory;
generate a determination to irrigate the crop based on the soil moisture tension data, the output of the crop water stress index, and the irrigation requirement; and
operate a valve to irrigate the crop based on the determination to irrigate the crop.

10. The device of claim 9, wherein the irrigation processor is further configured to execute the irrigation instructions to:
receive reservoir level data and store the reservoir level data in the memory; and
generate the determination to irrigate the crop based on the soil moisture tension data, the output of the crop water stress index, the irrigation requirement, and the reservoir level data.

11. The device of claim 9, wherein the infrared data is related to an infrared image of a crop canopy of the crop.

12. The device of claim 9, wherein the irrigation processor is further configured to execute the irrigation instructions to estimate a crop canopy temperature from the infrared data.

13. The device of claim 9, wherein the valve is piped between a water reservoir and sprinklers.

14. The device of claim 9, wherein the irrigation processor receives at least one of the soil moisture tension data, the infrared data, the ambient temperature data, the humidity data, the weather data, and the reservoir level data continually.

15. A method to irrigate a crop, the method comprising, by an irrigation processor:
receiving an input, wherein the input includes a crop, an area planted, and a location and storing in the memory;
receiving soil moisture tension data and storing the soil moisture tension data in the memory;
receiving infrared data and storing the infrared data in the memory;
receiving ambient temperature data and storing the ambient temperature data in the memory;
receiving humidity data and storing the humidity data in the memory;
generating an output of a crop water stress index for the crop based on the crop, the infrared data, the ambient temperature data, and the humidity data and storing the output of a crop water stress index in the memory;
receiving weather data and storing the weather data in the memory;
generating a water requirement for the crop based on the crop, the area planted, and an evapotranspiration of the crop and storing the water requirement in the memory;
determining an irrigation requirement for the crop based on the water requirement for the crop and the weather data and storing the irrigation requirement in the memory;
generating a determination to irrigate the crop based on the soil moisture tension data, the output of the crop water stress index, and the irrigation requirement; and
operating a valve to irrigate the crop.

16. The method of claim 15, further comprising the irrigation processor:
receiving reservoir level data and storing the reservoir level data in the memory; and
generating the determination to irrigate the crop based on the soil moisture tension data, the output of the crop water stress index, the irrigation requirement, and the reservoir level data.

17. The method of claim 15, further comprising the irrigation processor:
estimating a crop canopy temperature from the infrared data; and
generating the output of the crop water stress index for the crop based on the crop, the crop canopy data estimated from the infrared data, the ambient temperature data, and the humidity data.

18. The method of claim 15, wherein irrigation processor is configured to be in communication with an infrared camera and a drone and the infrared camera is mounted on the drone, the method further comprising the irrigation processor:
controlling the operation of the drone to fly the drone over the crop; and
controlling the infrared camera to capture the infrared data.

19. The method of claim 15, wherein the valve is piped between a water reservoir and sprinklers.

20. The method of claim 15, wherein the irrigation processor receives at least one of the soil moisture tension data, the infrared data, the ambient temperature data, the humidity data, the weather data, and the reservoir level data continually.

* * * * *